United States Patent
Lloyd et al.

(10) Patent No.: US 7,445,804 B2
(45) Date of Patent: Nov. 4, 2008

(54) CHOCOLATE COATED BEVERAGE CREAMER

(75) Inventors: Brian Lloyd, Raleigh, NC (US); Pablo Coronel, Cary, NC (US); Mandy Flint, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 704 days.

(21) Appl. No.: 10/508,098

(22) PCT Filed: Mar. 14, 2003

(86) PCT No.: PCT/US03/08257

§ 371 (c)(1),
(2), (4) Date: Jun. 20, 2005

(87) PCT Pub. No.: WO03/079821

PCT Pub. Date: Oct. 2, 2003

(65) Prior Publication Data

US 2005/0244544 A1 Nov. 3, 2005

Related U.S. Application Data

(60) Provisional application No. 60/365,643, filed on Mar. 19, 2002.

(51) Int. Cl.
*A23P 1/08* (2006.01)
(52) U.S. Cl. .................. 426/93; 426/91; 426/98; 426/99; 426/134; 426/594; 426/548; 426/586
(58) Field of Classification Search .................. 426/93, 426/91, 98, 99, 134, 586, 594, 548
See application file for complete search history.

(56) References Cited

U.S. PATENT DOCUMENTS

| | | | |
|---|---|---|---|
| 3,385,710 A | 5/1968 | Reymond et al. | |
| 3,518,737 A * | 7/1970 | Hood | 407/3 |
| 3,574,639 A * | 4/1971 | Forkner | 426/99 |
| 3,607,308 A * | 9/1971 | Dubble | 426/134 |
| 3,869,555 A * | 3/1975 | Heonis | 426/134 |
| 3,892,867 A * | 7/1975 | Schoonman | 426/93 |
| 4,426,402 A * | 1/1984 | Kaupert | 426/515 |
| 4,874,618 A * | 10/1989 | Seaborne et al. | 426/76 |
| 5,385,744 A * | 1/1995 | Cain et al. | 426/89 |
| 5,487,904 A | 1/1996 | Caly | |
| 5,589,194 A | 12/1996 | Tsuel et al. | |
| 5,626,902 A * | 5/1997 | Kuramori et al. | 426/607 |
| 5,635,230 A * | 6/1997 | Aasted | 426/138 |
| 6,790,466 B1 * | 9/2004 | Rabault et al. | 426/93 |
| 2002/0102333 A1 * | 8/2002 | Klug et al. | 426/93 |

* cited by examiner

*Primary Examiner*—Carolyn A Paden
(74) *Attorney, Agent, or Firm*—Myers Bigel Sibley & Sajovec, P.A.

(57) ABSTRACT

An article of manufacture useful for adding creamer base to hot beverages such as coffee or tea-based beverages comprises (a) a center core comprising a creamer base (for example, the creamer base preferably comprising a high-intensity sweetener and a humectant), and (b) an outer coating at least partially encapsulating the center core, the outer coating comprising chocolate. In a preferred embodiment the chocolate comprises not more than 10 percent by weight of cocoa butter and at least 20 percent by weight of vegetable oil, and with the chocolate coating preferably having a softening point of at least about 100° F. In a preferred embodiment, the article further comprises (c) an elongate stirring member having a distal end portion, with the distal end portion connected to the outer coating.

20 Claims, 6 Drawing Sheets

Start → 10 s        15 s        20 s 20 s        25 s        30 s

CHOCOLATE COATED BEVERAGE CREAMER

CROSS-REFERENCE TO RELATED APPLICATIONS

The present application is a 35 U.S.C. § 371 National Phase Application of International Application Serial. No. PCT/US03/08257, filed Mar. 14, 2003 and published in English as PCT Publication No. WO 03/079821 A1 on Oct. 2, 2003, which claims priority to U.S. Provisional Application Ser. No. 60/365,643, filed Mar. 19, 2002, the disclosures of each of which are incorporated herein by reference in their entireties.

FIELD OF THE INVENTION

The present invention relates to methods and products useful for adding a creamer to beverages such as coffee and tea.

BACKGROUND OF THE INVENTION

According to the National Coffee Association (NCA), 161 million people, or 79% of the adult population in the United States, consumed coffee in the year 2000. The NCA reported that 21 million Americans drank gourmet coffee daily, up from 4.5 million in 1993. According to Robert Nelson, NCA president and chief executive, "young adults (18-24 yrs) are more likely to drink gourmet-coffee beverages on a daily basis than older drinkers." Young adults purchase an average of 4.6 cups of any type of coffee each day, followed by the 25 to 29 year olds who consume 4.2 cups.

Most coffee purchased is further flavored by the consumer. Currently coffee is flavored primarily through the addition of a liquid creamer. Such creamers are typically packaged in small, plastic, foil-covered containers. The containers are subject to breakage and spoilage, the liquid requires stirring, and the refuse produced is inconvenient and unattractive. Accordingly, there is a need for new ways to add creamer and flavorings to coffee.

SUMMARY OF THE INVENTION

A first aspect of the present invention is an article of manufacture useful for adding creamer base to a hot beverage, comprising:
  (a) a center core comprising a creamer base (for example, the creamer base preferably comprising a high-intensity sweetener and a humectant), and
  (b) an outer coating at least partially encapsulating the center core (e.g., partially encapsulating or more preferably completely encapsulating or enrobing), the outer coating comprising chocolate (preferably with the chocolate comprising not more than 10 percent by weight of cocoa butter and at least 20 percent by weight of vegetable oil, and with the chocolate coating preferably having a softening point of at least about 100° F.). In a preferred embodiment, the center core is fully dispersed in an eight ounce cup of 160° F. liquid beverage such as coffee within 2 minutes, or more preferably within 1 minute, and still more preferably within one-half minute or 30 seconds with normal agitation (e.g., hand stirring with a teaspoon).

In one preferred embodiment, the article further comprises (c) an elongate stirring member having a distal end portion, with the distal end portion connected to the outer coating. The article may be wrapped with foil or other suitable packaging material.

A further aspect of the present invention is a method of flavoring a hot beverage; comprising the steps of
  (a) providing the article of manufacture as described above;
  (b) agitating (e.g., by normal hand stirring) the article in the hot beverage until the coating and the creamer base are dispersed therein. Preferably, the hot beverage (such as coffee) has a temperature between about 140 or 160 up to 200° F.

The present invention is explained in greater detail in the drawings herein and the specification set forth below.

DETAILED DESCRIPTION OF THE PREFERRED EMBODIMENTS

Figure 1A:
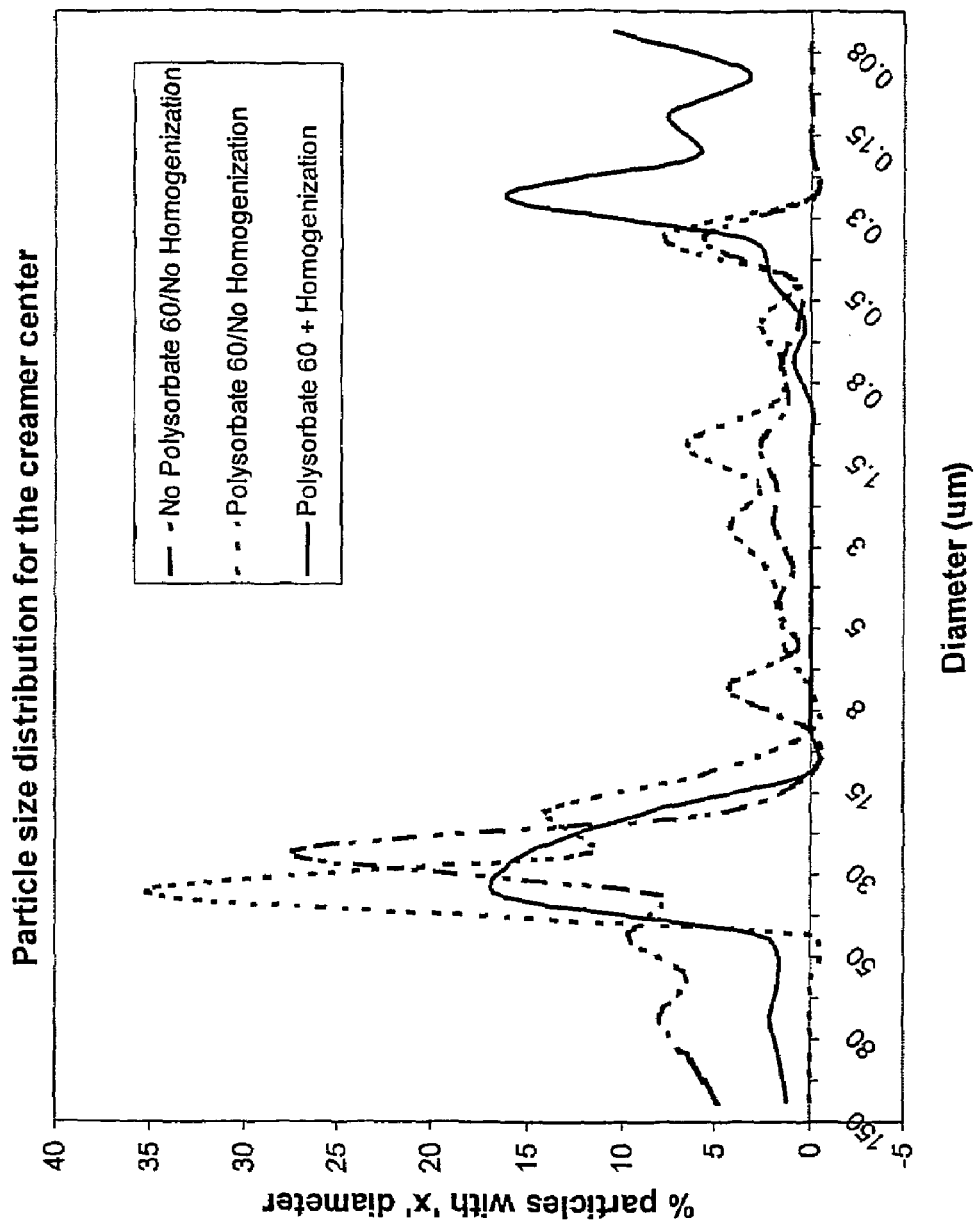
FIG. 1A depicts the effect of emulsifiers and homogenization on creamer particle size.

While the present invention is concerned primarily with the flavoring and preparation of coffee (this term including coffee-based beverages such as cappucino and espresso), it will be appreciated that other hot beverages (preferably a beverage at about 140 or 160 to 200° F.) may be flavored by the methods and products described herein, including but not limited to tea, milk, hot cocoa, etc.

The term "chocolate" is intended to refer to all chocolate or chocolate-like compositions with a fat phase or fat-like composition. In the United States, chocolate is subject to a standard of identity (SOI) established by the U.S. Food and Drug Administration under the Federal Food, Drug and Cosmetic Act. Definitions and standards for the various types of chocolate are well established in the U.S. Nonstandardized chocolates are those chocolates which have compositions which fall outside the specified ranges of the standardized chocolates. The term "chocolate," as used herein, is intended to include standardized and non-standardized chocolates, i.e., including chocolates with compositions conforming to the SOI and compositions not conforming to the SOI, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions. Chocolate also includes products containing crumb solids or solids fully or partially made by a crumb process. Nonstandardized chocolates result when, for example, the nutritive carbohydrate sweetener is replaced partially or completely; or when the cocoa butter or milkfat are replaced partially or completely; or when components that have flavors that imitate milk, butter or chocolate are added or other additions or deletions in formula are made outside the FDA standards of identity of chocolate or combinations thereof. See, e.g., U.S. Pat. No. 6,521,278.

The chocolate used to carry out the present invention is preferably a coating chocolate in which the cocoa fat content has been reduced. More particularly, the chocolate contains not more than 3, 5 or 10 percent by weight of cocoa fat, and at least 10, 20, or 25 percent by weight of vegetable oil (such as partially hydrogenated vegetable oil).

Chocolate with a softening point above 100° F. is preferred for the present invention, and particularly chocolate with a softening point between about 100° F. and about 120° F. Chocolate with a softening point of about 110° F. is currently preferred. The softening point of chocolate may be adjusted by any suitable means, such as by including alternative source of fat such as partially hydrogenated vegetable oil as opposed to cocoa butter, as some or all of the fat in the chocolate, as noted above.

The creamer base may, in preferred embodiments, optionally include one or more additional ingredients such as whitener and flavorant.

The creamer base has, in preferred embodiments, a sweetness (as perceived by average or normal human subjects) equivalent to at least that of a 5, 7 or 9 percent by weight sucrose solution, and may have a sweetness equivalent to not more than that of a 15, 17 or 20 percent by weight sucrose solution.

The humectant in a preferred embodiment comprises corn syrup, and the humectant is preferably included in an amount sufficient to reduce the $a_w$ of the creamer base to 0.6 or less.

High intensity sweeteners that may be used to carry out the present invention include, but are not limited to, sucralose, sodium cyclamate, sodium saccharin, aspartame, and combinations thereof. Sucralose is currently preferred.

Whiteners that may be used to carry out the present invention include, but are not limited to, milk fats, sodium caseinate, titanium dioxide, calcium caseinate, nonfat dry milk, combinations thereof, etc.

Humectants that may be used to carry out the present invention include, but are not limited to, corn syrup, high fructose corn syrup, polyhydric alcohols (e.g., sorbitol, glycerol, xylitol and the like), polydextrose, combinations thereof, combinations thereof, etc. will be appreciated that the humectant may also serve a sweetening function.

Additional sweeteners that may be used (depending upon the choice of high intensity sweeteners and humectants) include, but are not limited to, sucrose, dextrose, fructose, maltodextrin, glucose, tagatose, lactose, invert sugar, maltose, etc Flavorants that may optionally be included in the chocolate and/or creamer components of the instant invention may include noncoffee flavors of natural or artificial in origin. Example noncoffee flavors include almond nut, amaraetto, anisette, brandy, cappuccino, mint, cinnamon, cinnamon almond, creme de menthe, grand mariner, peppermint stick, pistachio, sambuca, apple, chamomile, cinnamon spice, creme, creme de menthe, vanilla, french vanilla, Irish creme, kahlua, lemon, macadamia nut, orange, orange leaf, peach, strawberry, grape, raspberry, cherry, coffee, chocolate and the like, aroma enhancers such as acetaldehyde, herbs, spices, mocha, butternut, rum, hazelnut, horchata, dulche de leche, etc., as well as mixtures of these flavors. See, e.g., U.S. Pat. No. 6,207,206.

Typical ingredients of an example creamer base include:
from 36 or 40 to 50, 56 or 60 percent by weight of sucrose (or other sweetener);
from 16, 18 or 20 to 28, 30 or 35 percent by weight cream powder (or other source of milk fat such as whole milk powder);
from 6, 8 or 10 to 20, 25 or 30 percent by weight corn syrup (or other humectant);
water to balance, typically from 3 or 6 to 12, 15 or 20 percent by weight water;
optionally, from 1 or 2 to 5 or 10 percent by weight sodium caseinate (or other whitener);
optionally, from 0.1 or 0.5 to 4 or 6 percent by weight flavorants;
optionally, from 0.1, or 0.2 to 0.8 or 1 percent by weight polysorbate 60;
optionally, from 0.1 to 0.3 percent by weight dipotassium phosphate;
preferably, from 0.01, 0.05, or 0.1 to 0.3, 0.5, or 0.7 percent by weight sucralose (or other high intensity sweetener);
optionally, from 0.05 or 0.08 to 0.12 or 0.2 percent by weight potassium sorbate; and
optionally, from 0.03 or 0.04 to 0.06, 0.07 or 0.1 percent by weight carrageenan.

The stirring member or stirrer used to carry out certain preferred embodiments of the present invention is elongate in shape and is sufficiently rigid to support the encapsulated creamer and provide a means to agitate or stir coffee to mix ingredients therein. The stirring member may solid or hollow be in any suitable shape such as a straw, paddle, etc. The stirring member may be connected to the encapsulated creamer by any suitable means but is preferably connected by adhering the outer chocolate coating to the stirring member, e.g., by casting or molding the coating onto the stirring member. In a preferred embodiment the creamer and coating are in a preformed shape such as a heart, truffle or bon-bon, which preformed shape may be substantially axially aligned with the stirring member. In some embodiments, the stirring member is not included and agitation or stirring can be accomplished with a separate spoon or stirrer.

In use, the article of the present invention is placed in a hot beverage as described above and agitated therein, such as by stirring, until the article including coating and core is dispersed therein. By "dispersed" is meant that the article is substantially uniformly distributed within the liquid by dissolution, suspension, etc., and no longer exists as a discrete physical entity. Agitation is meant ordinary hand agitation, not so vigorous as to spill a typical serving of beverage (e.g., an eight ounce serving) from a typical cup therefore, and is typically carried out by stirring (although a covered cup could be hand shaken). Preferably the article will fully disperse within 2 minutes, 1 minute, or 30 seconds from the onset of agitation. Agitation or stirring may be carried out with a stirring member formed onto or connected to the core as described herein, or by agitation with a spoon, stirrer or the like when a stirring member is not included as part of the article of manufacture.

The present invention is explained in greater detail below. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which do not depart from the instant invention. Hence, the following specification is intended to illustrate some particular embodiments of the invention, and not to exhaustively specify all permutations, combinations and variations thereof.

EXAMPLE 1

Formulation

Ingredients chosen for the creamer center each have specific functions needed to obtain the desired attributes which include texture, viscosity, dissolvability, whitening, and flavor of the present invention. An example of the formulation of the present invention is outlined in Table 1.

TABLE 1

Formulation

|  | Ingredient | % Formula | % Individual formulation |
|---|---|---|---|
| CREAMER CENTER | Sucrose | 27.06 | 46.65 |
|  | Cream Powder | 13.89 | 23.95 |
|  | Corn Syrup 26 DE | 8.12 | 14.00 |
|  | Water | 5.16 | 8.90 |
|  | Sodium Caseinate | 1.97 | 3.40 |
|  | Flavor | 1.16 | 2.00 |
|  | Polysorbate 60 | 0.29 | 0.50 |
|  | Dipotassium phosphate | 0.15 | 0.25 |
|  | Sucralose | 0.12 | 0.20 |
|  | Potassium sorbate | 0.06 | 0.10 |
|  | Carrageenan | 0.03 | 0.05 |
|  | SUBTOTAL | 58.00 | 100.00 |
| CHOCOLATE | Milk Chocolate | 19.00 | 45.00 |
|  | White Chocolate | 21.00 | 55.00 |
|  | SUBTOTAL |  | 100.00 |
|  | TOTAL | 100.00 |  |

EXAMPLE 2

Coffee Creamer Center

The cream center of the present invention delivers flavorful and smooth characteristics to consumers daily cup of coffee. The ingredients selected have specific functions that impart the desired attributes, which include whitening ability, viscosity/mouth-feel, dispersability, and flavor, to be met.

There were many technical challenges to overcome in the formulation of the cream center. First and foremost, we needed to have a good-tasting product with sufficient sweetness to soften the bitter flavor associated with coffee. A mixture of sweeteners was added to round out the sweetness profile. Sucrose was desireable for providing sweetness and solubility. 26 dextrose equivalent (DE) corn syrup (CS) was added in order to lower water activity and to impart a smooth, creamy, mouth-feel.

Most coffee creamers are not shelf stable unless aseptically packaged or spray dried. However, creating a shelf-stable product was a priority for the present invention. As a humectant, CS was the preferable choice of ingredients to lower the water activity ($a_w$) enough to achieve this goal. Prior to addition of CS, the $a_w$ was 0.84. After replacing approximately one third of the sucrose with CS, the $a_w$ decreased to 0.54, which is in the range to avoid not only pathogen growth ($a_w$<0.85), but below the growth range of osmotolerant yeasts and molds ($a_w$<0.65).

EXAMPLE 3

Sweetness and Flavoring

Sucrose is the main sweetening agent used in the creamer center because it easily dissolves and maintains its sweetness perception at high temperatures. Fructose was examined, but perceived sweetness decreased at high temperatures. Though sugars were added to 60% of the total volume of the cream center, the flavor perception of sweetness in coffee was still not as intense as desired. Therefore a high intensity sweetener, sucralose, was added. Because sucralose is approximately 600 times sweeter than sucrose, it was added at low levels to approximately double the sweetness level of sucrose and CS. Sucralose was chosen because of its heat stability and clean aftertaste. Different combinations of sucrose, CS, and sucralose were screened in order to optimize the sweetness level in coffee.

Although sweetness is a very important attribute for the present invention, flavor is the distinguishing characteristic in consumers' minds. Vanilla and chocolate flavors were added to increase perceived chocolate intensity and balance the overall flavors with the mellowness of vanilla.

EXAMPLE 4

Whitening and Mouth-Feel

The present invention also whitens coffee and gives it a pleasant, creamy mouth-feel. This is due to the presence of milk fat and casein. Cream powder provided milkfat needed for whitening, mouthfeel, and flavor. Caseinates also contribute opacity, dairy flavor, and rich mouth-feel. Non-fat dried milk was considered, but did not dissolve well or impart the creaminess that whole milk powder and cream powder displayed. κ-carrageenan was added to increase the body and mouth-feel of the creamer.

Additionally, the cream center is sheared during mixing and homogenized prior to pasteurization. Experiments determined that cream that had been homogenized whitened the coffee to a greater extent than non-homogenized cream. Added emulsifiers contribute to mouthfeel by adding body and enhancing creamer stability. Polysorbate 60 was chosen as an emulsifier because of its synergistic stabilizing effect with sodium caseinate and because it is fairly solid at room temperature.

Figure 1B:
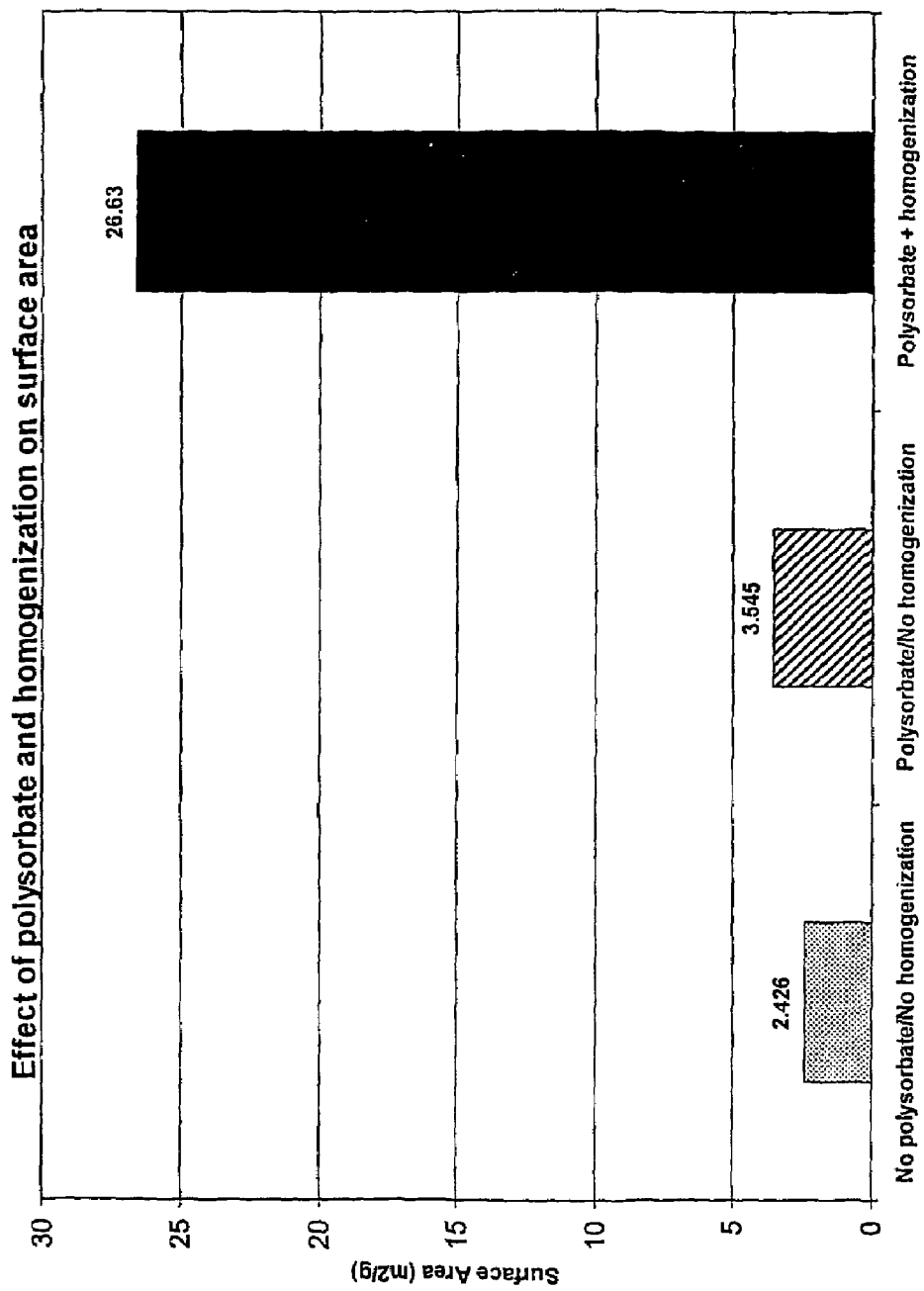
FIG. 1B depicts the effect of emulsifiers and homogenization on surface area.

In order to determine the effectiveness of the Polysorbate 60 and the homogenization (Omni-Mixer Homogenizer, Sorvall) step to stabilize and reduce particle size during processing, three creamer samples were examined in a centrifugal particle size analyzer (Shimadzu Corporation, Japan). As expected, the creamer sample with no Polysorbate 60 and no homogenization resulted in the largest particle size diameters (FIG. 1A) and smallest surface area (FIG. 1B). Addition of the emulsifier did not significantly decrease particle size. However, when a combination of the Polysorbate 60 and homogenization was utilized, a drastic decrease in mean particle size diameter and increase in surface area was observed.

Figure 2:
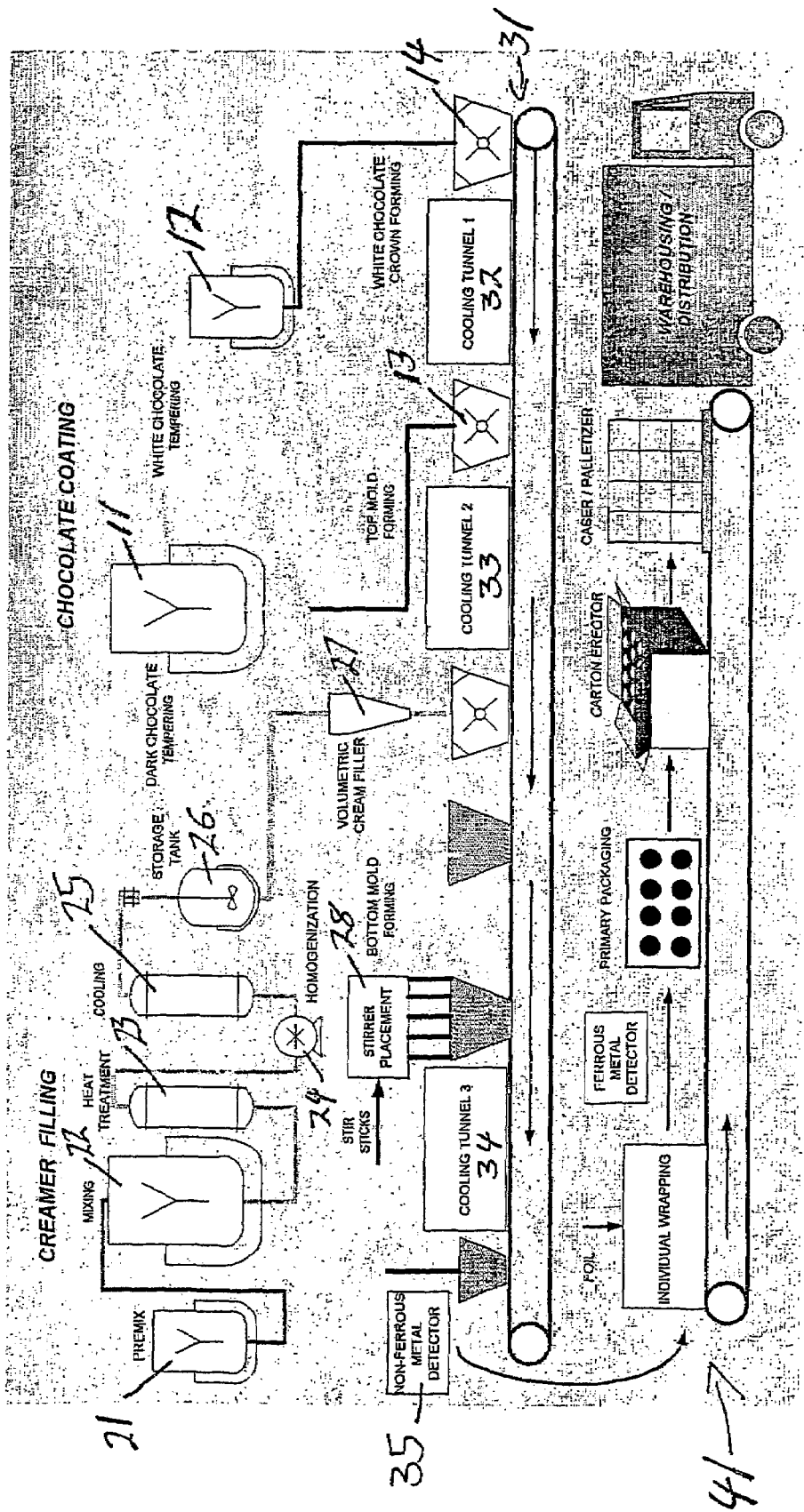
FIG. 2. Process flow diagram for the production of shelf-stable, chocolate coated creamers according to the present invention.

Cream powder and whole milk powder provide milkfat needed for whitening, texture, and milky flavor. During homogenization (see Process Flow Diagram, FIG. 2), milk fat globules are coated by the caseinate milk protein and added emulsifiers create an emulsion preventing separation. The white casein reflects light, and milk fat globules attribute an opaque white appearance. Emulsifiers are also essential as they contribute to mouthfeel, creamer stability, and prevention of oiliness when dissolved in the coffee. Polysorbate 60 was chosen as an emulsifier because of its synergistic effect with sodium caseinate. Caseinates, in addition to emulsifying capability, exhibit water binding and foam stabilization properties. Caseinates as well as creamer powder also contribute opacity, a mild dairy flavor, and rich mouthfeel.

Sucrose is desired for providing sweetness and viscosity. Non-reducing sugars were used to prevent extensive Maillard browning.

Natural French vanilla flavor complements the entire product with or without coffee. Vanilla and fruity notes add a balance of richness, and body to tame coffee's bite. Also, vanilla complements chocolate flavors well by intensifying them.

EXAMPLE 5

Stability and Solubility

It is preferable that the present invention does not phase separate upon its addition to coffee. Dipotassium phosphate functions as a buffering agent. This is desirable because the coffee's acidity can dramatically affect the solubility of the creamer, namely the isoelectric precipitation of casein at pH 4.6. Therefore, dipotassium phosphate adds stability by buffering pH against drastic changes that might cause feathering, which is separation of milk proteins from the solution forming a white precipitate. The emulsifiers also stabilize the system.

Figure 3:
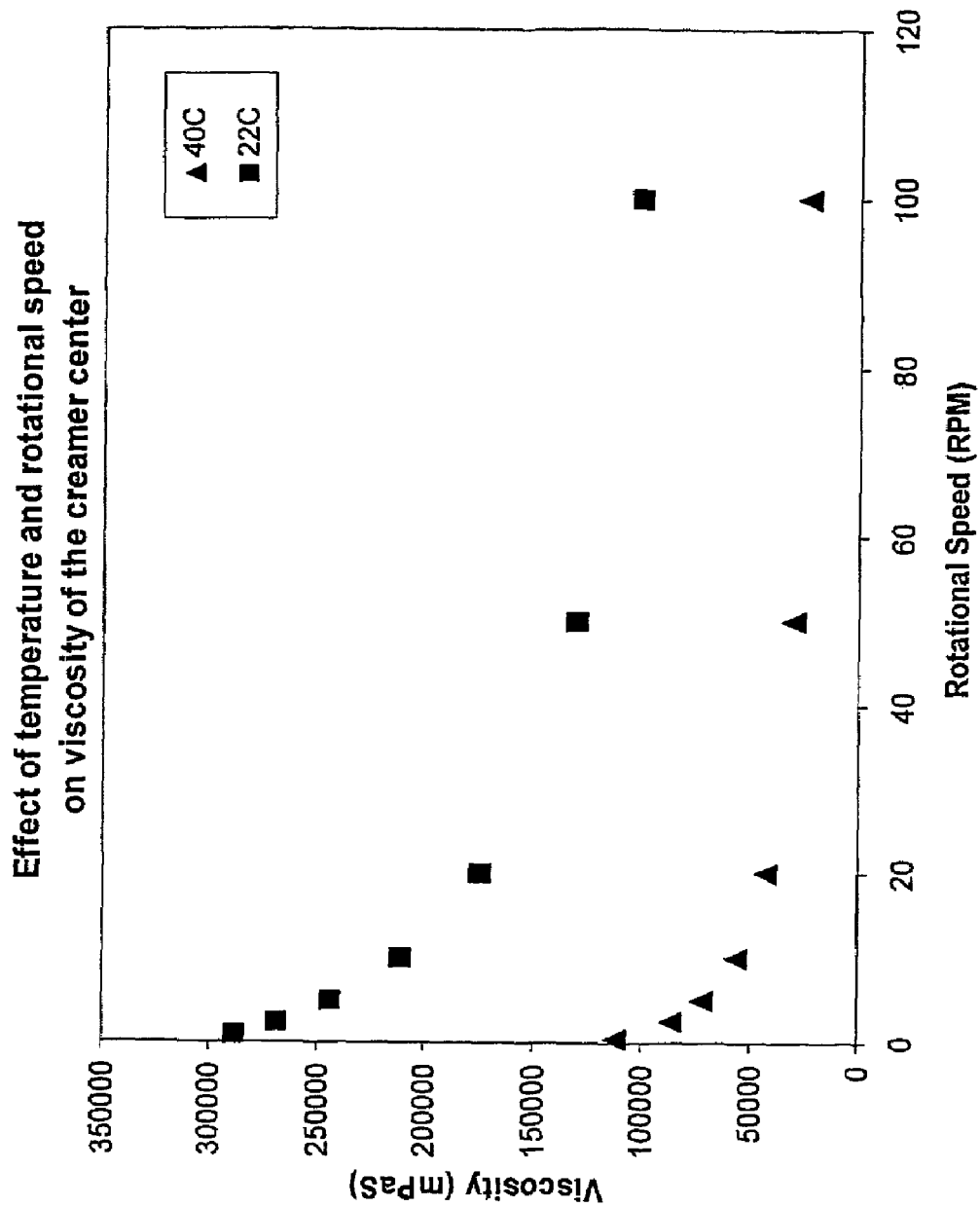
FIG. 3 depicts the effect of temperature and rotational speed on the viscosity of the creamer center.

The cream center also needs to dissolve easily in the coffee. Homogenization (e.g., at 1600-1700 psi) is preferable for emulsion stability and allows increased solubility in the coffee. Viscosity characteristics can be used to model both dispersability and processing parameters. Viscosity of the cream was measured at various shear rates using a Brookfield Viscometer (HB, spindles 6 and 7). The cream center displayed a lower viscosity at higher temperatures (40° C.) and also exhibited shear-thinning behavior (FIG. 3). These attributes are important both for processing and end product use and function. The cream will easily be pumped through processing equipment at elevated temperatures with higher shear. When the creamer is immersed in hot coffee, dispersability is heightened by temperature as well as stirring.

EXAMPLE 6

Chocolate Coating

The chocolate coating surrounding the flavored coffee cream serves to conveniently encase the creamer and to create a mocha drink. In a preferred embodiment the chocolate coating is a two-piece composite mold of both white and dark chocolate coatings. Both coatings are considered industrial high-grade chocolate coatings, which are less expensive than traditional, real chocolate. Both chocolates contain partially hydrogenated vegetable oil as opposed to cocoa butter as the fat source. The vegetable oils provide much greater versatility and ability to process than a cocoa butter chocolate by increasing the softening point to approximately 43° C. (110° F.). The increased melting temperature allows a greater tolerance to temperatures commonly experienced during warehousing and distribution above 100° F.

More importantly, this fat also allows improved melting in coffee, which is typically held at 160 to 200° F. The Code of Federal Regulations (CFR) standard of identity regulations allows labeling of "milk chocolate coating" for this formulation. The other ingredients in the milk chocolate are consistent with a standard formulation including real chocolate (chocolate liquor). The lethicin in chocolate also increases the solubility of the melted chocolate in the coffee, thereby increasing the creamy mouthfeel of the finished drink.

A combination of white and dark chocolate was used as the primary coating agent with white chocolate accents. A mixture was used to minimize the amount of unsuspended cocoa particles that tended to aggregate, which were viewed as a negative appearance by consumers (see sensory analysis section). The white chocolate coating also added to the whiteness of the final coffee mixture and was less bitter than the dark chocolate coating, while the dark chocolate improved the outward visual appearance.

EXAMPLE 7

Shelf Life and Safety

In general, chocolate confections usually have a water activity less than 0.62. However, in order to maintain a low viscosity, the water activity of the present invention is 0.84. Due to this high water activity, a preservative was added (0.1% potassium sorbate) to allow stability at room temperature and to inhibit osmophilic yeast and molds. Both yeast and molds can cause varying degrees of retrogression and decomposition of product and this why a preservative is essential. The chocolate coating serves as a protective barrier against the absorption of atmospheric moisture, which can lead to product spoilage.

The temperature range for growth of yeasts and molds in this product was calculated from 5° C. to 35° C. Food-borne yeasts and molds could grow on this product when the water activity is above 0.85. Control of the water activity during the product formation will prevent yeast and mold spoilage and keep the product shelf stable. By adding potassium sorbate as a preservative to increase the osmotic pressure, yeast growth will be inhibited and crystallization formation on the chocolate shell will be reduced. Because the pH is 6.6 and the water activity is 0.84, it is especially important that all raw ingredients are not contaminated and 0.1% potassium sorbate is added.

*Salmonella* or *Enterobacteriaceae* may be a potential problem when processing the present invention due to contaminated milk product used in the center. Antimicrobial barriers or hurdles such as pH water activity, and addition of preservative reduces the risk of microbial spoilage by *Staph aureus* in the truffle. All ingredients in processing of the present invention should meet the confectionery manufacturing standards of identity by the FDA. The final product will be plated to prove that the creamer center is stable and free from pathogenic or spoilage microorganisms at room temperature. Aerobic plate counts are expected to be less than the $10^4$ per gram and there is a zero tolerance for coliforms. Both yeast and mold counts cannot exceed 100 per gram. Due to unstable pathogenic organisms, the present invention is estimated to be stable at room temperature with a shelf life of approximately 3 to 4 months until spoilage by lipid oxidation is expected to occur, rendering the product unacceptable.

The prevention of spoilage and microbial contamination of the product can be attained in various ways. It is important to obtain raw materials that are free from microorganisms. Non-sporeforming pathogenic bacteria such as *Salmonella* are a concern if the cocoa beans or milk product is thermal processed inadequately. Because all ingredients are spray dried and then rehydrated, it is very important that the water supply be routinely checked for pathogens. The product formulation must be within the limits for pH, water activity, and addition of a preservative.

A HACCP plan is desirable to insure the safety of the present invention. Critical control points (CCP) potentially include maintaining pathogen-free raw ingredients, including water. It is desirable that the chocolate be non-contaminated because there is no associated heating step, this testing will be initiated. Also, it is preferable to pasteurize the cream center for 20 minutes at 60° C. The low temperature minimizes protein denaturation and flavor degradation. Final CCP may include a metal detector prior to primary packaging to help reduce physical hazards.

A microbiological shelf-life study for three weeks is summarized in Table 2. Samples were incubated at 30° C. and tested weekly for total aerobic plate count, yeast/mold, and osmotolerant yeast and mold. Salmonella or coliforms were not detected in the initial product sample. Preliminary product results show that there was no significant increase in the microbial population over a four-week period. The product will continue to ensure safety for the duration of the shelf-life and is expected to be stable at least about 4-6 months.

TABLE 2

Microbial Testing for Cream at 30° C.

| Media | 0 days | Week 1 | Week 2 | Week 3 |
|---|---|---|---|---|
| APC @ 35° C. | <100 | <100 | <10 | <10 |
| Yeast/Mold | <100 | — | <10 | <10 |
| Osmotolerant Yeast/Mold[a] | — | — | — | — |

APC = Aerobic plate count
[a]Potato dextrose agar with 25% sucrose

EXAMPLE 8

Whitening Ability

The degree of whitening is an important measure of success for the present invention. In order to measure the whitening ability, four commercial products were selected to whiten 7 ounce cups of STARBUCK'S® House Blend Coffee, which is a very dark coffee. If the present invention can effectively whiten this strong and dark coffee, it would be effective in other lighter blends. These 4 products were INTERNATIONAL DELIGHTS®Liquid Creamer Singles (French Vanilla), Nestle Carnation COFFEEMATE® Coffee Creamer, FOOD LION® Store brand Half & Half, and INTERNATIONAL DELIGHTS® Nondairy Creamer. These products were added to the 7 ounce cups of coffee based on their recommended serving sizes. The whiteness level and general appearance of these products was compared to the present invention (data not shown). Although the whitening by the present invention was slightly darker due to the suspended cocoa particles, the whitening was still acceptable and similar in appearance to that produced by the traditional creamers.

EXAMPLE 9

Melting Ability

Figure 4:
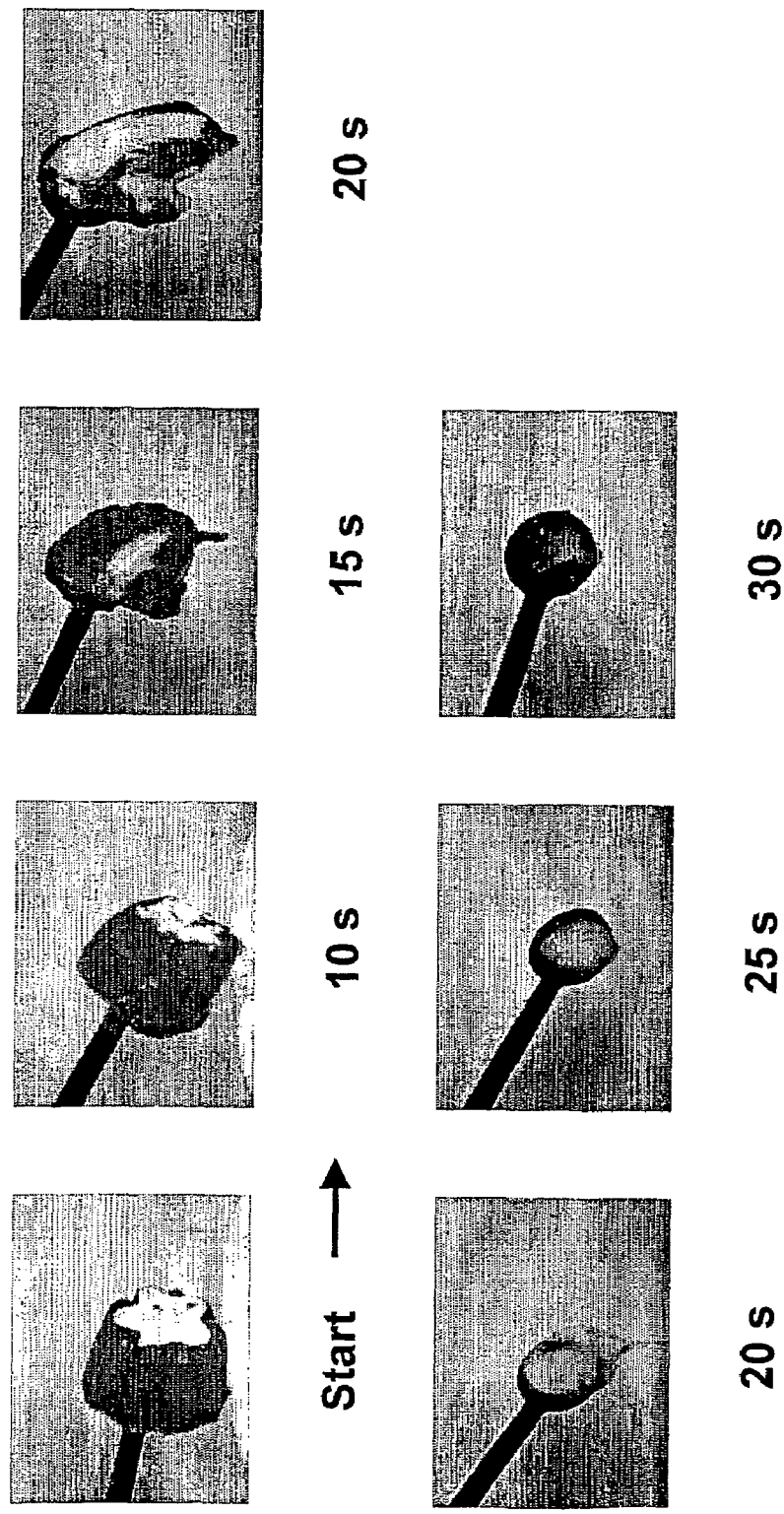
FIG. 4 shows the melting behavior of a creamer according to the present invention in coffee.
Figure 5:
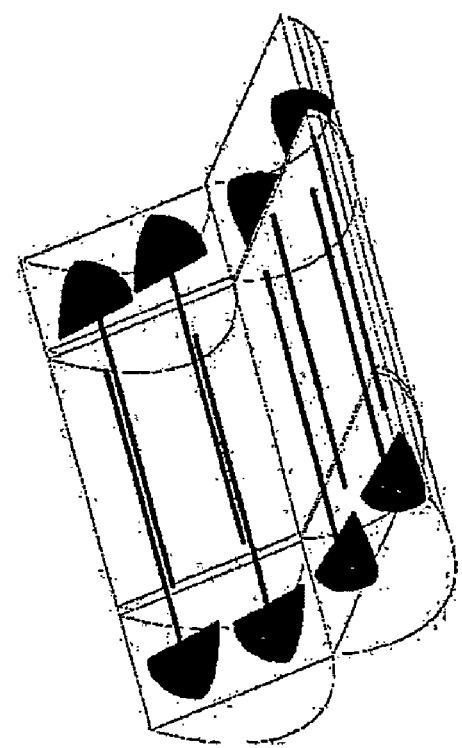
FIGS. 5A and 5B show a packaged example of Mocha Royale.
Figure 5:

The present invention should completely melt in hot coffee within a satisfactory amount of time, preferably within 30 seconds. Several timed experiments were undertaken to ensure that the product would perform this goal. As shown in FIG. 4, the coating was completely softened and melted within 10 seconds. The creamer center took about 20 seconds to solubilize and disperse. Three separate trials showed that less than 30 seconds were necessary to dissolve the product in a 7-oz. cup of 120° F. coffee stirring normally.

EXAMPLE 10

Processing

The production of the instant invention is designed to optimize quality and minimize costs.

The manufacturing process (Process Flow Diagram, FIG. 2) starts by breaking up large blocks of pre-molded chocolate coating and melting them in large agitated tempering tanks 11, 12. Once molten, the liquid chocolate is pumped to temperature-regulated molds 13, 14. The chocolate molding process and equipment is common and well established in the confection industry, (Equipment & Processing Specifications, Table 3). Maintaining critical tempering and molding temperatures as well as precise mold cooling will prevent fat or sugar bloom of the chocolate coating.

Creamer processing starts with premixing several ingredients prior to a primary mixing stage. The premix tank 21 is heated and agitated to allow initial interaction of the emulsifiers with the milk fat and water. Additional mixing may occur in mixing tank 22. The primary mix is then heated in a scraped surface heat 23 exchanger to 68° C. to inactivate yeasts and molds. The lower temperature also reduces browning and milk protein denaturation, and protects flavors. The shelf-stable cream is preferably homogenized in homogenizer 24 and then cooled 25, optionally held in a storage tank 26 and volumetrically dispensed into the open top-half of the mold through filler 27. A bottom layer of chocolate finishes the mold with (if desired) a stirrer inserted into the bottom layer through placement apparatus 28 (see Process Flow Diagram, FIG. 2 and Equipment Specifications, Table 3). A modified lollipop or popsickle stick placer adequately performs this task. The processing line 31 may include cooling tunnels 32, 33, 34 or the like as necessary, and preferably an optical sensor 35 detects proper stirrer placement. A final cooling step hardens the product prior to packaging via packaging line 41.

TABLE 3

Equipment and Processing Specifications

| Processing Step | Required Equipment | Production Time (min.) | Temp. (° C.) |
|---|---|---|---|
| CREAMER FILLING | | | |
| Premix | Jacketed tank | 5 | 40 |
| Sanitary pump | Positive displacement lobe type | | |
| Mixing | Jacketed tank | 7 | 50 |
| Sanitary pump | Positive displacement lobe type | | |
| Homogeneization | Homogenizer | | 50 |
| Heating Stage | Scraped surface heat exchanger | 0.5 | 68 |

TABLE 3-continued

Equipment and Processing Specifications

| Processing Step | Required Equipment | Production Time (min.) | Temp. (° C.) |
|---|---|---|---|
| Cooling Stage | Scraped surface heat exchanger | 0.5 | 45 |
| Surge tank | Jacketed tank, with agitation | | 25 |
| Sanitary pump | Positive displacement lobe type | | |
| Volumetric filling | Pistonless dosificator, injector | | |
| WHITE CHOCOLATE | | | |
| Tempering | Tempering tank | | 29 |
| Sanitary pump | Piston type | | |
| Top mold forming | Pistonless dosificator, injector | | |
| Bottom mold forming | Pistonless dosificator, injector | | |
| MILK CHOCOLATE | | | |
| Tempering | Tempering tank | | 29 |
| Sanitary pump | Piston type | | |
| Crown forming | Pistonless dosificator, injector | | |
| COOLING TUNNELS | | | |
| Tunnel 1 | | 10 | 10 |
| Tunnel 2 | | 15 | 10 |
| Tunnel 3 | | 15 | 10 |
| STIRRER PLACEMENT | | | |
| Custom made stirrer placement equipment | | | |
| METAL DETECTORS | | | |
| Non-Ferrous | | | |
| Ferrous | | | |
| PACKAGING | | | |
| Foil Wrapper | | | |
| Primary packaging | | | |
| Carton Erector | | | |
| Case packing in boxes | | | |
| Palletizer | | | |

EXAMPLE 11

Sweetness in Creamer Center

Sweetness of the creamer center was evaluated using the Spectrum technique on a 15 point scale with specific sucrose solutions for guide anchors at: 5, 8, 10, 12, 15 corresponding to 5, 8, 10, 12, and 15% sucrose solutions. This technique is how high-intensity sweeteners are evaluated for sweetening power, and this technique is widely accepted as reliable in the food science field. Eight panelists with 100 plus hours of sensory training evaluated the creamer sample in duplicate. The average sweetness intensity was 12.0 (n=16) with a standard deviation of 0.90. This indicates that the sweetness of the creamer was equivalent to a 12.0% sucrose solution.

The foregoing is illustrative of the present invention, and is not to be construed as limiting thereof. The invention is defined by the following claims, with equivalents of the claims to be included therein.

That which is claimed is:

1. An article of manufacture useful for adding creamer base to a hot beverage, comprising:
   (a) a center core comprising a creamer base, said creamer base comprising a high-intensity sweetener and a humectant;
   (b) an outer coating at least partially encapsulating said center core, said coating comprising chocolate, with said chocolate comprising not more than 10 percent by weight of cocoa butter and at least 20 percent by weight of vegetable oil, and with said chocolate having a softening point of at least about 100° F.;
   and wherein said center core is fully dispersed in an eight ounce cup of 160° F. liquid beverage within 1 minute with normal agitation.

2. An article according to claim 1, said article further comprising:
   (c) an elongate stirring member having a distal end portion, with said distal end portion connected to said outer coating.

3. An article according to claim 1, wherein said high intensity sweetener is selected from the group consisting of sucralose, sodium cyclamate, sodium saccharin, aspartame, and combinations thereof.

4. An article according to claim 1, wherein said humectant comprises corn syrup in an amount sufficient to reduce the $a_w$ of said creamer base to 0.6 or less.

5. An article according to claim 1, said creamer base further comprising a whitener.

6. An article according to claim 5, wherein said whitener is selected from the group consisting of milk fat, sodium caseinate, titanium dioxide, and combinations thereof.

7. An article according to claim 1, said creamer base further comprising a flavorant.

8. The article of claim 1, wherein said creamer base has a sweetness equivalent to a 5 to 20 percent by weight sucrose solution.

9. The article of claim 1, wherein said creamer base comprises:

from 36 to 56 percent by weight of sucrose;
from 18 to 30 percent by weight cream powder;
from 10 to 20 percent by weight corn syrup; and
from 6 to 12 percent by weight water.

10. The article of claim 9, wherein said creamer base further comprises:
from 2 to 5 percent by weight sodium caseinate;
from 0.5 to 4 percent by weight flavorants;
from 0.2 to 0.8 percent by weight polysorbate 60;
from 0.1 to 0.3 percent by weight dipotassium phosphate;
from 0.1 to 0.3 percent by weight sucralose;
from 0.08 to 0.12 percent by weight potassium sorbate; and
from 0.03 to 0.07 percent by weight carrageenan.

11. A method of flavoring a hot beverage; comprising the steps of
(a) providing the article of manufacture of claim 1; and then
(b) agitating said article in said hot beverage until said coating and said creamer base are dispersed therein.

12. The method of claim 11, wherein said hot beverage has a temperature of between about 140 and 200° F.

13. The method of claim 11, wherein said hot beverage is coffee.

14. The method of claim 11, wherein said agitating step is carried out by stirring.

15. The method of claim 11, said article further comprising:
(c) an elongate stirring member having a distal end portion, with said distal end portion connected to said outer coating.

16. The method of claim 11, wherein said humectant comprises corn syrup in an amount sufficient to reduce the $a_w$ of said creamer base to 0.6 or less.

17. The method of claim 11, said creamer base further comprising a whitener.

18. The method of claim 11, said creamer base further comprising a flavorant.

19. The method of claim 11, wherein said creamer base has a sweetness equivalent to a 5 to 20 percent by weight sucrose solution.

20. The method of claim 11, wherein said creamer base comprises:
from 36 to 56 percent by weight of sucrose;
from 18 to 30 percent by weight cream powder;
from 10 to 20 percent by weight corn syrup; and
from 6 to 12 percent by weight water.

* * * * *